Patented Jan. 1, 1952

2,581,097

UNITED STATES PATENT OFFICE 2,581,097

TREATMENT OF MOLTEN STEEL

Frederick J. Griffiths, Massillon, Ohio

No Drawing. Application May 10, 1950,
Serial No. 161,264

9 Claims. (Cl. 75—56)

This invention relates, as indicated, to the treatment of molten steel.

In my U. S. Patent No. 2,446,759, I have disclosed an open-hearth process in which a layer of slag comprising calcium oxide and iron oxide is formed on a bath of molten steel in an open hearth furnace, and an exothermic reaction mixture consisting of sodium nitrate and ferrosilicon is ignited in contact with the slag, thereby producing sodium oxide capable of reacting with one or more components of the slag to modify the characteristics of the slag and promote a reaction between carbon contained in the steel and iron oxide contained in the steel and slag.

The process effects a reduction in the carbon content, and a slight reduction in the sulphur content of the steel, but little or no reduction in the silicon, since the effectiveness of the sodium nitrate is largely lost, due to the fact that it reacts with the ferrosilicon, which itself contains a large proportion of silicon and therefore the sodium nitrate has little or no effect in reducing the silicon content of the steel itself.

Attempts to reduce the sulphur content of the steel usually include the addition of large amounts of lime to the furnace to increase the basicity of the slag, so that the volume of slag is increased, and the effectiveness of the sodium nitrate-ferrosilicon mixture is further reduced.

Aside from the foregoing disadvantages, there is a further disadvantage in that the total time for producing a heat of steel, having a desired low content of sulphur, carbon and silicon, is not reduced to any great extent over normal practice, when using such exothermic reaction mixtures.

I have discovered, as the result of a series of tests, both experimentally, and in actual production, that I can effect a rapid and better controlled reduction in the carbon, silicon and sulphur contents of the steel, particularly sulphur, by adding sodium nitrate alone to the furnace, in relatively large amounts, depending upon the silicon content of the steel.

The invention contemplates a method of treating molten steel in an open hearth furnace, which is effective to produce a clean steel, free from oxides and other impurities, with an increase in the yield of clean steel and a shortening in the time of production of each heat.

The invention further contemplates a method of treating molten steel, which involves a change of a physical nature in the "shaping up" of the slag, whereby the heat transfer to the metal bath is greatly accelerated, due to the use of sodium nitrate, which is used directly on the undissolved lime or in conjunction with calcium fluoride, to form a mixture or solution of a eutectic nature, i. e., having a low melting point, which facilitates transfer of heat to the molten steel, and produces a desired cleaning action on the steel.

The procedure, and the time of addition of the sodium nitrate varies somewhat, depending upon whether a "flush" or "non-flush" heat of steel is being produced. The term "flush" designates a heat of steel to which ore additions have been made, as a result of which, a very large volume of slag is created, a portion of which is flushed or removed from the furnace in the course of making the heat of steel, whereas the term "non-flush" refers to a heat of steel, to which such ore additions have not been made, and which therefore does not require such flushing. When a "flush" heat is being made, after the flushing, a large portion of the silica is removed incidental to the flushing operation, so that the heat is in what may be termed an endothermic condition, the temperature of the metal being relatively low, so that a relatively great increase in temperature is required to continue the purifying of the metal.

In accordance with the invention, and assuming that a flush heat of steel is being produced in a 150 ton open hearth furnace, when the heat is finishing flush, I add sodium nitrate to the heat, beginning with a 200 pound addition, and continuing, when necessary, to add sodium nitrate until a total of 500 pounds has been added. The reaction of the sodium nitrate with the lime increases the temperature to a desired point and saves considerable time in bringing the lime up from the bottom of the furnace. It brings the lime up quickly and in a relatively soft condition. The higher the silicon content of the heat, the greater the amount of sodium nitrate used. It is necessary to use enough sodium nitrate to bring the metal to a relatively high temperature. When the lime boil begins, no further additions of sodium nitrate are made until after the lime boil is completed.

The making of the heat is continued in the usual manner, but no more sodium nitrate is added until the heat is ready to be shaped up and the slag conditioned.

When the slag is ready to be shaped up, additions of fluorspar and sodium nitrate are made, 500 pounds of fluorspar being added for every 200 pounds of sodium nitrate, the fluorspar being first added by itself, and the heat being left undisturbed until the desired temperature is attained, and after about 10 minutes at such temperature, the sodium nitrate is added.

The sodium nitrate is preferably added when the fuel is off and the furnace is being reversed, the fuel being left off until the addition of sodium nitrate is completed The heat is then continued in the usual way, and the furnace tapped.

The addition of the sodium nitrate to the undissolved lime causes a generation of heat, and also causes the lime to dissolve, forming a eutectic of a higher lime-silica ratio. This higher lime-silica ratio, which is considerably in excess of 2.8:1, has a higher saturation value for the transfer of sulphur into the slag, with the result that the sulphur content of the steel is rapidly reduced. The carbon and silicon contents are also reduced rapidly, since the effectiveness of the sodium nitrate is not lost by reason of the fact that it is required to react exothermically with ferrosilicon.

Through the use of sodium nitrate at various times during the working of the heat, considerable time is saved, both in the faster dissolving of the lime into the slag and the preparation of a slag having a lime-silica ratio higher than is normally obtained.

The tonnage of steel produced per hour is increased, the sulphur content of the steel is lowered, and a cleaner steel, in general, is obtained.

The process saves money on fluxes, because for every pound of sodium nitrate which is used, two to three pounds of fluorspar are saved.

When a non-flush heat is being produced, after the hot metal has been added to the furnace, sodium nitrate is added to the heat, 200 pounds at a time, at least 500 pounds being added, until the lime boil is started, after which no further addition is made. The amount of sodium nitrate used depends upon the silicon content of the iron, the higher the silicon content, the greater the amount of sodium nitrate used. This procedure produces a desired high temperature, saves considerable time in the production of the heat, and gives a lower sulphur melt.

The making of the heat is continued in the usual manner, but no more sodium nitrate is added until the heat is ready to be shaped up and the slag conditioned.

When the slag is ready to be shaped up, additions of fluorspar and sodium nitrate are made, 500 pounds of fluorspar being added for every 200 pounds of sodium nitrate, the fluorspar being first added by itself and the heat being left undisturbed until the desired temperature is attained, and after about ten minutes at such temperature, the sodium nitrate is added.

The sodium nitrate is preferably added when the fuel is off and the furnace is being reversed, the fuel being left off until the addition of sodium nitrate is completed.

The following are examples of heats produced in accordance with the invention:

HEAT 5627

Furnace charge:
Pig iron _____ 4,300
Car wheels _____ 54,050
Molds _____ 24,800
Borings iron _____ 15,000
Crops _____ 78,700
2 Hev melt _____ 66,050
Turnings _____ 96,750
Pit scrap _____ 11,400
Burnt lime _____ 16,200

Ladle additions:
70# AL
1050# Reg. FeMn
600# L. C. FeMn
Mold addition—48# AL
Other details:
Yield, 88.7%
Net tons, 159.4
N/T per hr. T-T, 9.96
16 hrs. tap-tap, 1:30 Int.
75—17×17×64—318,750

Analysis in percent

|  | C | Mn | Phos | Sul | Cr | Ni | Mo | Sn | Cu |
|---|---|---|---|---|---|---|---|---|---|
| Final | .07 | .31 | .010 | .027 | .05 | .13 | .03 | .02 | .23 |
| 9:45 a. m. |  |  |  | .074 |  |  |  |  |  |
| 10:55 a. m. |  |  |  | .046 |  |  |  |  |  |
| 11:50 a. m. |  |  |  | .033 |  |  |  |  |  |

Log data

| 8:50 a. m. | 400# NaNO3 |
| 9:10 | 3000# burnt lime |
| 9:17/20 | Oxygen |
| 9:45 | Lab .074 sulphur |
| 9:50 | 200# NaNO3 400# spar |
| 10:10 | 1000# spar 500# roll scale |
| 10:35 | 1500# burnt lime |
| 10:55 | Lab .046 sul. |
| 11:05 | 3000# pig iron |
| 11:20 | 300# spar 400# roll scale |
| 11:50 | .033 sul. |
| 12:00 noon | 3000# burnt lime |
| 12:15 p. m. | 200# rim flux 100# NaNO3 |
| 12:20/26 | Oxygen |
| 12:50 | Tap |

Rim flat to center
Good grade burnt lime

HEAT 5633

Furnace charge:
Pig iron _____ 22,500
B-F skull _____ 48,250
Wheels _____ 12,600
Crops _____ 70,550
1 steel _____ 50,950
2 Hev melt _____ 81,550
Turnings _____ 42,650
Burnt lime _____ 16,850

Ladle additions:
60# AL
1150# FeMn
600# L. C. Mn
Mold addition—35#
Other details:
Yield, 85.2
Net tons, 148.7
N/T per hr. T-T, 11.01
13:30 tap-tap, 1:00 Int.
70—17×17×64—297,500

Analysis in percent

|  | C | Mn | Phos | Sul | Cr | Ni | Mo | Sn | Cu |
|---|---|---|---|---|---|---|---|---|---|
| Final | .08 | .38 | .010 | .027 | .06 | .13 | .01 | .03 | .27 |
| 7:50 a. m. |  |  |  | .055 | .10 | .13 | .01 | .03 | .27 |
| 9:10 a. m. |  | .14 |  | .043 |  |  |  |  |  |
| 9:35 a. m. |  | .11 |  | .036 |  |  |  |  |  |

Log data

| Time | Action |
|------|--------|
| 7:20 a. m | 300# NaNO₃ |
| 7:50 | Test to lab .055 sul. |
| 8:15 | 200# NaNO₃ 400# spar |
| 8:30 | 600# roll scale 1000# spar |
| 9:10 | Lab .043 sul. 1000# pig iron |
| 9:35 | Lab .036 sul. |
| 9:40/45 | Oxygen |
| 9:50/55 | Oxygen |
| 10:10 | Tap |

Ingot wt., 4250

It is to be understood that various changes in the method, as described, may be resorted to, without departing from the scope of the subjoined claims.

It is apparent from the foregoing examples that the sulphur is rapidly reduced during the making of each heat, a result which has not been attainable with the use of exothermic reaction mixtures of the character described.

Having thus described my invention, I claim:

1. The improvement in a method of producing steel in an open hearth furnace which comprises forming a bath of molten metallic iron in the furnace having a layer of a lime slag thereon, and adding sodium nitrate alone onto the slag, the reaction of the sodium nitrate with the lime increasing the temperature of the bath, thereby aiding in transfer of heat through the slag to the molten iron, and aiding in starting the lime boil.

2. The method, as defined in claim 1, in which additions of fluorspar are made to the furnace slag after the slag has been conditioned.

3. The method, as defined in claim 1, in which alternate additions of fluorspar and sodium nitrate alone are made to the slag after the first addition of sodium nitrate, the ratio of fluorspar to sodium nitrate being about 5 to 2.

4. The method, as defined in claim 3, in which the additions of sodium nitrate are made at those intervals when the furnace is being reversed and the fuel is off.

5. The improvement in a method of producing steel in an open hearth, which comprises forming a bath of slag-covered molten metallic iron in an open hearth furnace, adding sodium nitrate alone onto the slag when the heat is finishing flush, then adding additional amounts of sodium nitrate alone sufficient to increase the temperature of the bath, whereby to start a lime boil.

6. The method, as defined in claim 5, in which the total amount of sodium nitrate added varies in accordance with the amount of silicon in the bath.

7. The method, as defined in claim 5, in which no further additions of sodium nitrate are made until after the lime boil is completed, after which fluorspar and sodium nitrate are alternately added.

8. The improvement in a method of producing steel in an open hearth, which comprises forming a bath of slag-covered molten metallic iron in an open hearth furnace in which a non-flush heat is being produced, and then, after hot metal has been added to the furnace, adding sodium nitrate alone in increments, until a lime boil is started, the total amount of sodium nitrate added depending upon the silicon in the bath.

9. The method, as defined in claim 8, in which no further additions of sodium nitrate are made until after the lime boil is completed, after which fluorspar and sodium nitrate are alternately added.

FREDERICK J. GRIFFITHS.

REFERENCES CITED

The following references are of record in the file of this patent:

UNITED STATES PATENTS

| Number | Name | Date |
|--------|------|------|
| 94,995 | Bessemer | Sept. 21, 1869 |
| 594,497 | Stockman | Nov. 30, 1897 |
| 1,997,602 | Robinson | Apr. 16, 1935 |
| 2,446,759 | Griffiths | Aug. 10, 1948 |

OTHER REFERENCES

Metal Progress, December 1947, page 966. Published by the American Society for Metals, Cleveland, Ohio.